(12) United States Patent
Kelley et al.

(10) Patent No.: US 6,232,967 B1
(45) Date of Patent: May 15, 2001

(54) WEB BROWSER COLUMN CONTROL

(75) Inventors: Edward E. Kelley, Wappingers Falls; Norman J. Dauerer, Hopewell Junction, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/977,185

(22) Filed: Nov. 24, 1997

(51) Int. Cl.[7] .................................................. G06F 13/00
(52) U.S. Cl. ........................ 345/333; 345/973; 707/503; 707/509; 707/513; 707/517
(58) Field of Search ..................... 707/503, 504, 707/509, 513, 517, 511, 512; 345/333, 342, 352, 353, 354, 973, 118, 121, 123

(56) References Cited

U.S. PATENT DOCUMENTS

| | | | |
|---|---|---|---|
| 4,763,356 | 8/1988 | Day, Jr. et al. | 379/368 |
| 5,530,759 | 6/1996 | Braudaway et al. | 380/54 |
| 5,647,056 | 7/1997 | Barrett et al. | 395/200.1 |
| 5,893,127 | * 4/1999 | Tyan et al. | 707/513 |
| 5,937,417 | * 8/1999 | Nielsen | 707/513 |
| 5,970,506 | * 4/1999 | Kiyan et al. | 707/503 |

OTHER PUBLICATIONS

IBM Technical Disclosure Bulletin, "Resource Access Control Facility Password Propagation for Multiple Virtual Storage", vol. 36, No. 06B, Jun. 1993.
IBM Technical Disclosure Bulletin, "Network Signon Coordination Configuration", vol. 36, No. 12, Dec. 1993.
IBM Technical Disclosure Bulletin, "Network Signon Coordination Configuration", vol. 36, No. 12, Dec. 1993.

* cited by examiner

*Primary Examiner*—Ba Huynh
(74) *Attorney, Agent, or Firm*—DeLio & Peterson LLC; Peter W. Peterson; Aziz M. Ahsan

(57) ABSTRACT

Web browser interaction with HTML files is modified to allow for columns of row headings to be defined as non-scrollable so that the headings will always be visible as the data rows are scrolled to the left or to the right. Multiple non-scrollable row headings may be in an adjacent position and certain row headings are allowed to displace other columns of row headings when they are in an adjacent position. A new HTML tag, referred to as the column scroll tag, identifies a column of row headings in a file as non-scrollable depending on the screen position of the column. When there is a column of headings that reach the left-most position of the screen, the columns become locked and remain on the screen. A column scroll tag also has the property of displacement or no displacement. Displacement means that once two non-scrollable columns are adjacent, the right-most non-scrollable column would immediately displace the left-most column non-scrollable column, when the data is scrolled to the left on a screen. When the data is scrolled to the right on a screen, displacement means that once two non-scrollable columns are adjacent, the left-most non-scrollable column would immediately displace the right-most column non-scrollable column, when the data is scrolled to the left on a screen. Non-displacement means that when two columns are adjacent and at the left-most or right-most column positions, they both become locked in such screen positions.

31 Claims, 4 Drawing Sheets

WEB BROWSER COLUMN CONTROL

BACKGROUND OF THE INVENTION

1. Field of the Invention

The present invention relates to computer programs and in particular to software for enhancing document display on a computer screen in inter- or intra-net applications.

2. Description of Related Art

Current web browsers working with Hypertext Markup Language (HTML) are unable to display non-scrollable columns in files that are defined with HTML tags. For example, if there is a file with columns of data and row headings that define the data rows, the web browser will scroll left or right past the headings so that the headings, are displaced off the screen and the user is left with data rows and no descriptions. Table 1 shows a file, as it would appear on a screen, that has row headings that are of interest in retaining as the file is scrolled left or right. The two columns immediately to the right of "A" on Table 1 indicate the row headings that would be desirable to lock in place as the screen is scrolled to the right with respect to the file and the columns reach the left-most position of the screen.

TABLE 1

Weekend Huskie Production and Yield Status
Week 1

Day 5 of Day 24  Part # 16G5736 MUSKIE 64 mm   Customer: PQ Level L. Rapp 4up   Date 05-May 1997

| Cum C/T | C/T | WTD C/T | Sect # | Sector Name | Adr | Lam Ship | Daily Ship | Mtd Plan | Schd Actual | Mtd Delt | Delt Day | Wip Lam | Wip Actual | Yield Wip | Cum Wip | Schedul Yield | Daily Yield | Mtd Yield | ETN Wip | PUR Wip | EWR Wip |
|---|---|---|---|---|---|---|---|---|---|---|---|---|---|---|---|---|---|---|---|---|---|
| 19.8 | 1.0 | 1.1 | 9611 | TSM Depo | 25 | | | 125 | 105 | −20 | −0.8 | 8 | 31 | 21 | 702 | 99.7% | 100.0% | 100.0% | | | |
| 18.8 | 1.0 | 1.7 | 9621 | TSM Phot | 26 | 2 | 8 | 130 | 50 | −80 | −3.1 | 26 | 94 | 65 | 681 | 100.0% | 100.0% | 100.0% | 3 | | |
| 17.8 | 0.7 | 0.3 | 9631 | TSM Meta | 25 | | | 125 | 42 | −83 | −3.3 | 2 | 8 | 6 | 616 | 99.6% | 100.0% | 100.0% | | | |
| 17.1 | 0.5 | 1.3 | 9681 | TSM Etch | 26 | | | 130 | 30 | −100 | −3.8 | 15 | 51 | 35 | 610 | 98.8% | 100.0% | 100.0% | 2 | | |
| 16.6 | 0.7 | 1.8 | 9691 | TSM Meas | 26 | | | 130 | 44 | −86 | −3.3 | | | | 575 | 99.8% | 100.0% | 100.0% | | | |
| 15.9 | 1.1 | 1.1 | 9701 | Elect Te | 19 | | | 95 | 59 | −36 | −1.9 | | 1 | 1 | 575 | 90.1% | 100.0% | 95.7% | | | |
| 14.8 | 2.4 | 4.2 | 9711 | Rep.Sols | 18 | 1 | 4 | 90 | 119 | 29 | 1.6 | 10 | 34 | 27 | 574 | 88.6% | 100.0% | 90.8% | 3 | 1 | |
| 12.4 | 0.7 | 2.2 | 9721 | TSM Poly | 19 | 4 | 10 | 95 | 96 | 1 | 0.1 | 20 | 53 | 47 | 548 | 99.8% | 100.0% | 81.5% | 7 | 2 | |
| 11.7 | | 0.4 | 9731 | Substock | 20 | | | 100 | 122 | 22 | 1.1 | 4 | 8 | 7 | 501 | 99.6% | 100.0% | 100.0% | 7 | 16 | |
| 11.7 | 5.4 | 2.8 | 9733 | New B-I | 20 | | | 100 | 181 | 81 | 4.1 | 46 | 106 | 94 | 494 | 99.9% | 100.0% | 100.0% | 14 | 2 | |
| 6.3 | | 1.4 | 9737 | Substock | 21 | | | 105 | 140 | 35 | 1.7 | 24 | 63 | 56 | 399 | 100.0% | 100.0% | 100.0% | 3 | | |
| 6.3 | 0.4 | 1.5 | 9741 | ECLAT | 21 | 8 | 18 | 105 | 141 | 36 | 1.7 | 3 | 9 | 8 | 343 | 99.9% | 100.0% | 100.0% | 2 | | |
| 5.9 | 0.3 | 0.2 | 9745 | BSM Au | 21 | 8 | 18 | 105 | 141 | 36 | 1.7 | | | | 335 | 100.0% | 100.0% | 100.0% | | | |
| 5.6 | 0.3 | 2.6 | 9751 | Laser Et | 25 | | | 125 | 181 | 56 | 2.2 | 27 | 69 | 61 | 335 | 99.8% | 100.0% | 99.5% | 6 | 3 | |
| 5.3 | 0.7 | 0.8 | 9761 | SBDepos | 25 | 11 | 32 | 125 | 205 | 80 | 3.2 | | | | 274 | 100.0% | 100.0% | 100.0% | | | |
| 4.6 | 1.0 | 1.0 | 9841 | C4 Plate | 26 | | | 130 | 143 | 13 | 0.5 | 39 | 97 | 87 | 274 | 100.0% | 100.0% | 100.0% | 3 | 9 | |
| 3.6 | 0.3 | 0.7 | 9851 | Photo Pr | 27 | 22 | 64 | 135 | 158 | 23 | 0.9 | | | | 187 | 100.0% | 100.0% | 100.0% | | | |
| 3.3 | 0.5 | 0.4 | 9855 | Dice | 26 | N/A | | 130 | 94 | −36 | −1.4 | 22 | 61 | 54 | 187 | 99.9% | 100.0% | 100.0% | 12 | 3 | |
| 2.8 | 0.2 | 0.0 | 9857 | Job Spli | 26 | N/A | | 130 | 105 | −25 | −1.0 | N/A | 1 | 1 | 133 | 99.7% | 100.0% | 100.0% | | 2 | |
| 2.6 | 0.3 | 0.8 | 9861 | P/R Remo | 26 | N/A | | 130 | 118 | −12 | −0.5 | N/A | | | 133 | 100.0% | 100.0% | 100.0% | | | |
| 2.3 | 0.4 | 0.5 | 9871 | Pstb/iEm | 24 | N/A | 1 | 120 | 112 | −8 | −0.3 | N/A | 1 | | 132 | 90.4% | 100.0% | 94.1% | | | |
| 1.9 | 0.1 | | 9875 | Data Ver | | N/A | | | 121 | 121 | na | N/A | | | 132 | 100.0% | 100.0% | 100.0% | | | |
| 1.8 | 0.3 | 0.5 | 9881 | Prbraz I | 24 | N/A | 7 | 120 | 117 | −3 | −0.1 | N/A | 6 | 6 | 132 | 100.0% | 100.0% | 99.2% | | 3 | |
| 1.5 | | | 9707 | SBandRwk | | N/A | | | | | na | N/A | | | 126 | 100.0% | 100.0% | 100.0% | | | |
| 1.5 | | | 9715 | Braze Rw | | N/A | | | | | na | N/A | 4 | 4 | 126 | 100.0% | 100.0% | 100.0% | 1 | | |
| 1.5 | 0.5 | 0.7 | 9901 | Pin Atta | 23 | N/A | | 115 | 106 | −9 | −0.4 | N/A | 18 | 18 | 122 | 99.9% | 100.0% | 100.0% | 5 | 4 | |
| 1.0 | | 2.8 | 9001 | Bpol.Rwk | | N/A | | | 1 | 1 | na | N/A | 2 | 2 | 104 | 100.0% | 100.0% | 100.0% | | | |
| 1.0 | | | 9309 | BSMPadE | | N/A | 1 | | 1 | 1 | na | N/A | | | 102 | 100.0% | 100.0% | 100.0% | | | |
| 1.0 | 0.3 | 0.3 | 9903 | BSM Insp | 23 | N/A | 8 | 115 | 106 | −9 | −0.4 | N/A | 2 | 2 | 102 | 99.8% | 100.0% | 100.0% | 2 | | |
| 1.0 | 0.7 | 5.5 | 9915 | Final In | 28 | N/A | | 140 | 130 | −10 | −0.4 | N/A | 101 | 100 | 100 | 99.4% | 100.0% | 99.2% | 14 | 3 | |
| 0.7 | | | 9995 | Pok Sub | | | | YTD | | | | | 1 | 1 | 1 | 100.0% | 100.0% | 100.0% | | | |
| | | | | TOTALS | | | | 672 | 2847 | | | 247 | 819 | 702 | | 69.3% | 100.0% | 65.2% | | | |
| | | | | | | | | | 130 | −542 | | | | | | | | | | | |

Table 2 below shows the file as it would first appear on a monitor screen in a beb browser with the arrow "A" as a point of reference.

TABLE 2

VIEWING A DOCUMENT ON A COMPUTER SCREEN

Day of Day  
5  24  
Part# 16G5736 Huskie 64 mm

Weekend Huskie Production  
Week 1  
Customer: PQ Level L

| Cum C/T | C/T | WTD C/T | Sect # | Sector Name | Adr | Lam Ship | Daily Ship | Mtd Plan | Schd Actual | Mtd Delt | Delt Day | Wip Lam | Wip Actu |
|---|---|---|---|---|---|---|---|---|---|---|---|---|---|
| 19.8 | 1.0 | 1.1 | 9611 | TSM Depo | 25 | | | 125 | 105 | −20 | −0.8 | 8 | 3 |
| 18.8 | 1.0 | 1.7 | 9621 | TSM Phot | 26 | 2 | 8 | 130 | 50 | −80 | −3.1 | 26 | 9 |
| 17.8 | 0.7 | 0.3 | 9631 | TSM Meta | 25 | | | 125 | 42 | −83 | −3.3 | 2 | |
| 17.1 | 0.5 | 1.3 | 9681 | TSM Etch | 26 | | | 130 | 30 | −100 | −3.8 | 15 | 5 |
| 16.6 | 0.7 | 1.8 | 9691 | TSM Meas | 26 | | | 130 | 44 | −86 | −3.3 | | |
| 15.9 | 1.1 | 1.1 | 9701 | Elect Te | 19 | | | 95 | 59 | −36 | −1.9 | 1 | |
| 14.8 | 2.4 | 4.2 | 9711 | Rep.Sols | 18 | 1 | 4 | 90 | 119 | 29 | 1.6 | 10 | 3 |
| 12.4 | 0.7 | 2.2 | 9721 | TSM Poly | 19 | 4 | 10 | 95 | 96 | 1 | 0.1 | 20 | 5 |
| 11.7 | | 0.4 | 9731 | Substock | 20 | | | 100 | 122 | 22 | 1.1 | 4 | |
| 11.7 | 5.4 | 2.8 | 9733 | New B-I | 20 | | | 100 | 181 | 81 | 4.1 | 46 | 10 |
| 6.3 | | 1.4 | 9737 | Substock | 21 | | | 105 | 140 | 35 | 1.7 | 24 | 6 |
| 6.3 | 0.4 | 1.5 | 9741 | ECLAT | 21 | 8 | 18 | 105 | 141 | 36 | 1.7 | 3 | |
| 5.9 | 0.3 | 0.2 | 9745 | BSM Au | 21 | 8 | 18 | 105 | 141 | 36 | 1.7 | | |
| 5.6 | 0.3 | 2.6 | 9751 | Laser Et | 25 | | | 125 | 181 | 56 | 2.2 | 27 | 6 |
| 5.3 | 0.7 | 0.8 | 9761 | SBDepos | 25 | 11 | 32 | 125 | 205 | 80 | 3.2 | | |
| 4.6 | 1.0 | 1.0 | 9841 | C4 Plate | 26 | | | 130 | 143 | 13 | 0.5 | 39 | 9 |
| 3.6 | 0.3 | 0.7 | 9851 | Photo Pr | 27 | 22 | 64 | 135 | 158 | 23 | 0.9 | | |
| 3.3 | 0.5 | 0.4 | 9855 | Dice | 26 | | | 130 | 94 | −36 | −1.4 | 22 | 6 |
| 2.8 | 0.2 | 0.0 | 9857 | Job Spli | 26 | N/A | | 130 | 105 | −25 | −1.0 | N/A | |
| 2.6 | 0.3 | 0.8 | 9861 | P/R Remo | 26 | N/A | | 130 | 118 | −12 | −0.5 | N/A | |
| 2.3 | 0.4 | 0.5 | 9871 | Pstb/iEm | 24 | N/A | | 120 | 112 | −8 | −0.3 | N/A | |
| 1.9 | 0.1 | | 9875 | Data Ver | | N/A | | | 121 | 121 | na | N/A | |
| 1.8 | 0.3 | 0.5 | 9881 | Prbraz I | 24 | N/A | 7 | 120 | 117 | −3 | −0.1 | N/A | |
| 1.5 | | | 9707 | SBandRwk | | N/A | | | | | na | N/A | |
| 1.5 | | | 9715 | Braze Rw | | N/A | | | | | na | N/A | |
| 1.5 | 0.5 | 0.7 | 9901 | Pin Atta | 23 | N/A | | 115 | 106 | −9 | −0.4 | N/A | 1 |
| 1.0 | | 2.8 | 9001 | BPol.Rwk | | N/A | | | 1 | 1 | na | N/A | |
| 1.0 | | | 9309 | BSMPadE | | N/A | 1 | | 1 | 1 | na | N/A | |
| 1.0 | 0.3 | 0.3 | 9903 | BSM Insp | 23 | N/A | 8 | 115 | 106 | −9 | −0.4 | N/A | |
| 0.7 | 0.7 | 5.5 | 9915 | Final In | 28 | N/A | | 140 | 130 | −10 | −0.4 | N/A | 10 |
| | | | 9995 | Pok Sub. | | | | YTD | 2847 | | | | |
| | | | | Totals | | | | 672 | 130 | −542 | | 247 | 81 |

Total Reqs. |

| | 05/02 | | 05/09 | | 05/16 | | 05/23 | | 05/30 | | 06/0 |
|---|---|---|---|---|---|---|---|---|---|---|---|
| | Complete | | 180 | | 327 | | 457 | | 653 | | 85 |
| Prime Reqs. | Complete | | 153 | | 270 | | 370 | | 536 | | 72 |

Table 3 below shows how the screen would appear as the data on the screen is scrolled to the left with respect to the screen.

TABLE 3

BEGINNING OF THE RIGHT SCREEN SCROLL (with respect to data)

Day of Day  
5  24  
5736 Huskie 64 mm

Weekend Huskie Production and Yield Stat  
Week 1  
Customer: PQ Level L. Rapp 4up

| Sect # | Sector Name | Adr | Lam Ship | Daily Ship | Mtd Plan | Schd Actual | Mtd Delt | Delt Day | Wip Lam | Wip Actual | Yield Wip | Cum Wip | Schedu Yield |
|---|---|---|---|---|---|---|---|---|---|---|---|---|---|
| 9611 | TSM Depo | 25 | | | 125 | 105 | −20 | −0.8 | 8 | 31 | 21 | 702 | 99.7 |
| 9621 | TSM Phot | 26 | 2 | 8 | 130 | 50 | −80 | −3.1 | 26 | 94 | 65 | 681 | 100.0 |
| 9631 | TSM Meta | 25 | | | 125 | 42 | −83 | −3.3 | 2 | 8 | 6 | 616 | 99.6 |
| 9681 | TSM Etch | 26 | | | 130 | 30 | −100 | −3.8 | 15 | 51 | 35 | 610 | 98.8 |
| 9691 | TSM Meas | 26 | | | 130 | 44 | −86 | −3.3 | | | | 575 | 99.8 |
| 9701 | Elect Te | 19 | | | 95 | 59 | −36 | −1.9 | 1 | 1 | 1 | 575 | 90.1 |
| 9711 | Rep.Sols | 18 | 1 | 4 | 90 | 119 | 29 | 1.6 | 10 | 34 | 27 | 574 | 88.6 |
| 9721 | TSM Poly | 19 | 4 | 10 | 95 | 96 | 1 | 0.1 | 20 | 53 | 47 | 548 | 99.8 |
| 9731 | Substock | 20 | | | 100 | 122 | 22 | 1.1 | 4 | 8 | 7 | 501 | 99.6 |
| 9733 | New B-I | 20 | | | 100 | 181 | 81 | 4.1 | 46 | 106 | 94 | 494 | 99.9 |

TABLE 3-continued

BEGINNING OF THE RIGHT SCREEN SCROLL (with respect to data)

|  |  |  | Day of 5 5736 Huskie |  | Day 24 64 mm |  | Weekend Huskie Production and Yield Stat Week 1 Customer: PQ Level L. Rapp 4up |  |  |  |  |  |  |  |
|---|---|---|---|---|---|---|---|---|---|---|---|---|---|---|
| Sect # | Sector Name |  | Adr | Lam Ship | Daily Ship | Mtd Plan | Schd Actual | Mtd Delt | Delt Day | Wip Lam | Wip Actual | Yield Wip | Cum Wip | Schedu Yield |
| 9737 | Substock |  | 21 |  |  | 105 | 140 | 35 | 1.7 | 24 | 63 | 56 | 399 | 100.0 |
| 9741 | ECLAT |  | 21 | 8 | 18 | 105 | 141 | 36 | 1.7 | 3 | 9 | 8 | 343 | 99.9 |
| 9745 | BSM Au |  | 21 | 8 | 18 | 105 | 141 | 36 | 1.7 |  |  |  | 335 | 100.0 |
| 9751 | Laser Et |  | 25 |  |  | 125 | 181 | 56 | 2.2 | 27 | 69 | 61 | 335 | 99.8 |
| 9761 | SBDepos |  | 25 | 11 | 32 | 125 | 205 | 80 | 3.2 |  |  |  | 274 | 100.0 |
| 9841 | C4 Plate |  | 26 |  |  | 130 | 143 | 13 | 0.5 | 39 | 97 | 87 | 274 | 100.0 |
| 9851 | Photo Pr |  | 27 | 22 | 64 | 135 | 158 | 23 | 0.9 |  |  |  | 187 | 100.0 |
| 9855 | Dice |  | 26 |  |  | 130 | 94 | −36 | −1.4 | 22 | 61 | 54 | 187 | 99.9 |
| 9857 | Job Spli |  | 26 | N/A |  | 130 | 105 | −25 | −1.0 | N/A |  |  | 133 | 99.7 |
| 9861 | P/R Remo |  | 26 | N/A |  | 130 | 118 | −12 | −0.5 | N/A | 1 | 1 | 133 | 100.0 |
| 9871 | Pstb/iEm |  | 24 | N/A |  | 120 | 112 | −8 | −0.3 | N/A |  |  | 132 | 90.4 |
| 9875 | Data Ver |  |  | N/A |  |  | 121 | 121 | na | N/A |  |  | 132 | 100.0 |
| 9881 | Prbraz I |  | 24 | N/A | 7 | 120 | 117 | −3 | −0.1 | N/A | 6 | 6 | 132 | 100.0 |
| 9707 | SBandRwk |  |  | N/A |  |  |  |  | na | N/A |  |  | 126 | 100.0 |
| 9715 | Braze Rw |  |  | N/A |  |  |  |  | na | N/A | 4 | 4 | 126 | 100.0 |
| 9901 | Pin Atta |  | 23 | N/A |  | 115 | 106 | −9 | −0.4 | N/A | 18 | 18 | 122 | 99.9 |
| 9001 | BPol.Rwk |  |  | N/A |  |  | 1 | 1 | na | N/A | 2 | 2 | 104 | 100.0 |
| 9309 | BSMPadE |  |  | N/A | 1 |  | 1 | 1 | na | N/A |  |  | 102 | 100.0 |
| 9903 | BSM Insp |  | 23 | N/A | 8 | 115 | 106 | −9 | −0.4 | N/A | 2 | 2 | 102 | 99.8 |
| 9915 | Final In |  | 28 | N/A |  | 140 | 130 | −10 | −0.4 | N/A | 101 | 100 | 100 | 99.4 |
| 9995 | Pok Sub. |  |  |  |  | YTD | 2847 |  |  |  | 1 | 1 | 1 | 100.0 |
|  | Totals |  |  |  |  | 672 | 130 | −542 |  | 247 | 819 | 702 |  | 69.3 |
|  |  |  |  |  |  |  |  |  |  |  |  | Cum Totals |  | 57.3 |
| 5/02 |  |  | 05/09 |  | 05/16 |  | 05/23 |  | 05/30 |  | 06/06 |  | ***** |  |
| Complete |  |  | 180 |  | 327 |  | 457 |  | 653 |  | 853 |  | 1053 |  |
| Complete |  |  | 153 |  | 270 |  | 370 |  | 536 |  | 724 |  | 912 |  |

It should be noted that the two columns to the right of "A" are lined up with the extreme left of the screen. It would be desirable to lock these two columns as the data continues to scroll to the left. Table 4 below shows that the two columns of row headings have disappeared from the screen as the data continues to be scrolled to the left.

TABLE 4

CONTINUE THE SCROLL

| y 24 E or e |  | Adr | 64 mm Lam Ship | Daily Ship | Mtd Plan | Customer: PQ Schd Actual | Weekend Huskie Production and Yield Status Week 1 Level Mtd Delt Delt Day | Wip Lam | L. Rapp 4up Wip Actual | Yield Wip | Cum Wip | 05-May Schedul Yield | 1 Daily Yield | Y |
|---|---|---|---|---|---|---|---|---|---|---|---|---|---|---|---|
| epo |  | 25 |  |  | 125 | 105 | −20 | −0.8 | 8 | 31 | 21 | 702 | 99.7% | 100.0% | 1 |
| hot |  | 26 | 2 | 8 | 130 | 50 | −80 | −3.1 | 26 | 94 | 65 | 681 | 100.0% | 100.0% | 1 |
| eta |  | 25 |  |  | 125 | 42 | −83 | −3.3 | 2 | 8 | 6 | 616 | 99.6% | 100.0% | 1 |
| tch |  | 26 |  |  | 130 | 30 | −100 | −3.8 | 15 | 51 | 35 | 610 | 98.8% | 100.0% | 1 |
| eas |  | 26 |  |  | 130 | 44 | −86 | −3.3 |  |  |  | 575 | 99.8% | 100.0% |  |
| Te |  | 19 |  |  | 95 | 59 | −36 | −1.9 | 1 | 1 | 1 | 575 | 90.1% | 100.0% |  |
| ols |  | 18 | 1 | 4 | 90 | 119 | 29 | 1.6 | 10 | 34 | 27 | 574 | 88.6% | 100.0% |  |
| oly |  | 19 | 4 | 10 | 95 | 96 | 1 | 0.1 | 20 | 53 | 47 | 548 | 99.8% | 100.0% | 1 |
| ock |  | 20 |  |  | 100 | 122 | 22 | 1.1 | 4 | 8 | 7 | 501 | 99.6% | 100.0% | 1 |
| -I |  | 20 |  |  | 100 | 181 | 81 | 4.1 | 46 | 106 | 94 | 494 | 99.9% | 100.0% | 1 |
| ock |  | 21 |  |  | 105 | 140 | 35 | 1.7 | 24 | 63 | 56 | 399 | 100.0% | 100.0% | 1 |
|  |  | 21 | 8 | 18 | 105 | 141 | 36 | 1.7 | 3 | 9 | 8 | 343 | 99.9% | 100.0% | 1 |
| u |  | 21 | 8 | 18 | 105 | 141 | 36 | 1.7 |  |  |  | 335 | 100.0% | 100.0% | 1 |
| Et |  | 25 |  |  | 125 | 181 | 56 | 2.2 | 27 | 69 | 61 | 335 | 99.8% | 100.0% |  |
| os |  | 25 | 11 | 32 | 125 | 205 | 80 | 3.2 |  |  |  | 274 | 100.0% | 100.0% | 1 |
| ate |  | 26 |  |  | 130 | 143 | 13 | 0.5 | 39 | 97 | 87 | 274 | 100.0% | 100.0% | 1 |
| Pr |  | 27 | 22 | 64 | 135 | 158 | 23 | 0.9 |  |  |  | 187 | 100.0% | 100.0% | 1 |
|  |  | 26 |  |  | 130 | 94 | −36 | −1.4 | 22 | 61 | 54 | 187 | 99.9% | 100.0% | 1 |
| pli |  | 26 | N/A |  | 130 | 105 | −25 | −1.0 | N/A |  |  | 133 | 99.7% | 100.0% | 1 |
| emo |  | 26 | N/A |  | 130 | 118 | −12 | −0.5 | N/A | 1 | 1 | 133 | 100.0% | 100.0% | 1 |
| iEm |  | 24 | N/A |  | 120 | 112 | −8 | −0.3 | N/A |  |  | 132 | 90.4% | 100.0% |  |
| Ver |  |  | N/A |  |  | 121 | 121 | na | N/A |  |  | 132 | 100.0% | 100.0% | 1 |
| z I |  | 24 | N/A | 7 | 120 | 117 | −3 | −0.1 | N/A | 6 | 6 | 132 | 100.0% | 100.0% |  |
| Rwk |  |  | N/A |  |  |  |  | na | N/A |  |  | 126 | 100.0% | 100.0% | 1 |
| Rw |  |  | N/A |  |  |  |  | na | N/A | 4 | 4 | 126 | 100.0% | 100.0% | 1 |

TABLE 4-continued

CONTINUE THE SCROLL

| y 24 E or e | Adr | 64 mm Lam Ship | Daily Ship | Mtd Plan | Customer: PQ Level Schd Actual | Mtd Delt | Weekend Huskie Production and Yield Status Week 1 Delt Day | L. Rapp 4up Wip Lam | Wip Actual | Yield Wip | Cum Wip | 05-May 1 Schedul Yield | Daily Yield | Y |
|---|---|---|---|---|---|---|---|---|---|---|---|---|---|---|
| tta | 23 | N/A | | 115 | 106 | −9 | −0.4 | N/A | 18 | 18 | 122 | 99.9% | 100.0% | 1 |
| Rwk | | N/A | | | 1 | 1 | na | N/A | 2 | 2 | 104 | 100.0% | 100.0% | 1 |
| dE | | N/A | 1 | | 1 | 1 | na | N/A | | | 102 | 100.0% | 100.0% | 1 |
| nsp | 23 | N/A | 8 | 115 | 106 | −9 | −0.4 | N/A | 2 | 2 | 102 | 99.8% | 100.0% | 1 |
| In | 28 | N/A | | 140 | 130 | −10 | −0.4 | N/A | 101 | 100 | 100 | 99.4% | 100.0% | |
| ub. | | | | YTD | 2847 | | | | 1 | 1 | 1 | 100.0% | 100.0% | 1 |
| ls | | | | 672 | 130 | −542 | | 247 | 819 | 702 | | 69.3% | 100.0% | |
| | | | | | | | | | | | Cum Totals | 57.3% | 100.0% | |
| 05/09 | | 05/16 | | 05/23 | | 05/30 | | 06/06 | | | ***** | | 06/20 | |
| 180 | | 327 | | 457 | | 653 | | 853 | | | 1053 | | 1062 | |
| 153 | | 270 | | 370 | | 536 | | 724 | | | 912 | | 909 | |

The prior art does not provide for multiple sets of columns of data, in a file, that become non-scrollable or locked when the columns are scrolled to a certain position on the screen. The columns consist of headings in each row that define the data in the rows to the right of the headings.

The prior art also does not provide for sets of different non-scrollable row headings in a file that contains different rows of data. Some files of related information have several different sets of headings that describe different data rows.

An approach which partially addresses the problem of non-scrollable headings is used in Frames from Netscape. Frames requires separate files for columns that are locked on the screen. Frames also requires special coding in the HTML source file to tie all of the frames together. Each frame becomes a window that is optionally scrolled. However, the problem of columns that are only locked in place when they reach the edges of the screen is not addressed, nor is one file provided to contain all of the non-scrollable row headings and the body of the file, nor are multiple columns with displacement or no-displacement properties addressed.

Bearing in mind the problems and deficiencies of the prior art, it is therefore an object of the present invention to provide a method and system usable on an inter- or intra-net web browser for locking in data file headings on a side position of a computer screen.

It is another object of the present invention to provide a method and system usable on an inter- or intra-net web browser for scrolling data across and off a computer screen while data file headings are locked on a side position of the screen.

A further object of the invention is to provide a method and system for sequentially locking in multiple data file headings on a side position of a computer screen.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for visually displaying multiple information and row headings on a computer screen using an inter- or intra-net web browser. The process comprises first providing a data file having a data heading column and a plurality of data columns associated with the data heading column. The process includes the steps of identifying the data heading column with an HTML tag; locking the data heading column on a side position of the computer screen; and scrolling the data columns across and off the screen while the data heading column is locked on the side screen position.

Said HTML tag may be a non-displaceable tag, and the process may further include the step of scrolling a second data heading column across the screen until the second data heading column is adjacent the first data heading column, such that the first data heading column remains locked in the side screen position. The process may also include the step of scrolling a second data heading column across the screen to the side screen position, such that the second data heading column displaces the first data heading column and the second data heading column is locked in the side screen position. Preferably, the HTML tag is a scroll tag comprising hypertext markup language.

Said data heading column may comprise a plurality of columns containing data headings, wherein the plurality of data heading columns are locked in the side screen position. Each of the data heading and data columns also may contain multiple rows. Preferably, the data heading and data columns are displayed in a single window in the web browser.

In another aspect, the present invention provides a process for visually displaying multiple information and row headings on a computer screen using an inter- or intra-net web browser comprising first providing a data file having a first data heading column and a plurality of first data columns associated with and to the right of the first data heading column and a second data heading column and a plurality of second data columns associated with and to the right of the second data heading column, the second data heading column and associated second data columns being to the right of the first data columns. The process further includes identifying each of the first and second data heading columns with an HTML tag; locking the first data heading column on a left side position of the computer screen; scrolling the first data columns across to the left and off the screen while the first data heading column is locked on the left side screen position; scrolling the second data heading column across to the left and locking the second data heading column on the left side position of the computer screen, thereby displacing the first data heading column; and scrolling the second data columns across to the left and off the screen while the second data heading column is locked on the left side screen position. Said first data heading column may be displaced off the screen.

A further aspect of the present invention relates to a process for visually displaying multiple information and row headings on a computer screen using an inter- or intra-net web browser wherein there is first provided a data file having a first data heading column and a plurality of first data column associated with and to the right of the first data heading column and a second data heading columns and a plurality of second data columns associated with and to the right of the second data heading column, the second data heading column and associated second data columns being to the right of the first data columns. The process also includes identifying each of the first and second data heading columns with an HTML tag; locking the second data heading column on a left side position of the computer screen; scrolling the second data columns across to the right and off the screen while the second data heading column is locked on the left side screen position, until a left-most second data column is adjacent the second data heading column; locking the first data heading column on the left side position of the computer screen, thereby displacing the second data heading column; and scrolling the first data columns across to the right of the screen while the first data heading column is locked on the left side screen position. Said second data heading column is displaced off the screen.

Another aspect of the invention provides a program storage device readable by a machine, tangibly embodying a program of instructions executable by the machine to perform the aforementioned methods of visually displaying multiple information and row headings on a computer screen using an inter- or intra-net web browser.

Yet another aspect of the invention relates to a system and article of manufacture for visually displaying multiple information and row headings on a computer screen using an inter- or intra-net web browser comprising a data file readable by the web browser having a data heading column and a plurality of data columns associated with the data heading column. A data heading column is provided with an HTML tag, the data heading column being adapted to lock on a side position of the computer screen and the data columns being adapted to scroll across and off the screen while the data heading column is locked on the side screen position.

A further aspect relates to a system and article of manufacture for visually displaying multiple information and row headings on a computer screen using an inter- or intra-net web browser comprising a data file readable by the web browser having a first data heading column and a plurality of first data columns associated with and to the right of the first data heading column and a second data heading column and a plurality of second data column associated with and to the right of the second data heading column, the second data heading column and associated second data columns being to the right of the first data columns. A first and second data heading column are provided with an HTML tag. Said first data heading column is adapted to lock on a left side position of the computer screen, the first data columns are adapted to scroll across to the left and off the screen while the first data heading column is locked on the left side screen position, and the second data heading column is adapted to scroll across to the left and lock on the left side position of the computer screen, thereby displacing the first data heading column. Said second data columns are adapted to scroll across to the left and off the screen while the second data heading column is locked on the left side screen position said first data heading column is adapted to be displaced off the screen.

Another aspect of the present invention provides a system and article of manufacture for visually displaying multiple information and row headings on a computer screen using an inter- or intra-net web browser comprising a data file readable by the web browser having a first data heading columns and a plurality of first data columns associated with and to the right of the first data heading column and a second data heading column and a plurality of second data columns associated with and to the right of the second data heading column, the second data heading column and associated second data columns being to the right of the first data column. A first and second data heading columns are provides with an HTML tag, the second data heading column being adapted to lock on a left side position of the computer screen, the second data columns being adapted to scroll across to the right and off the screen while the second data heading column is locked on the left side screen position, until a left-most second data column is adjacent the second data heading column. Said first data heading column is adapted to lock on the left side position of the computer screen, thereby displacing the second data heading column, and the first data columns are adapted to scroll across to the right of the screen while the first data heading column is locked on the left side screen position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

Figure 1:
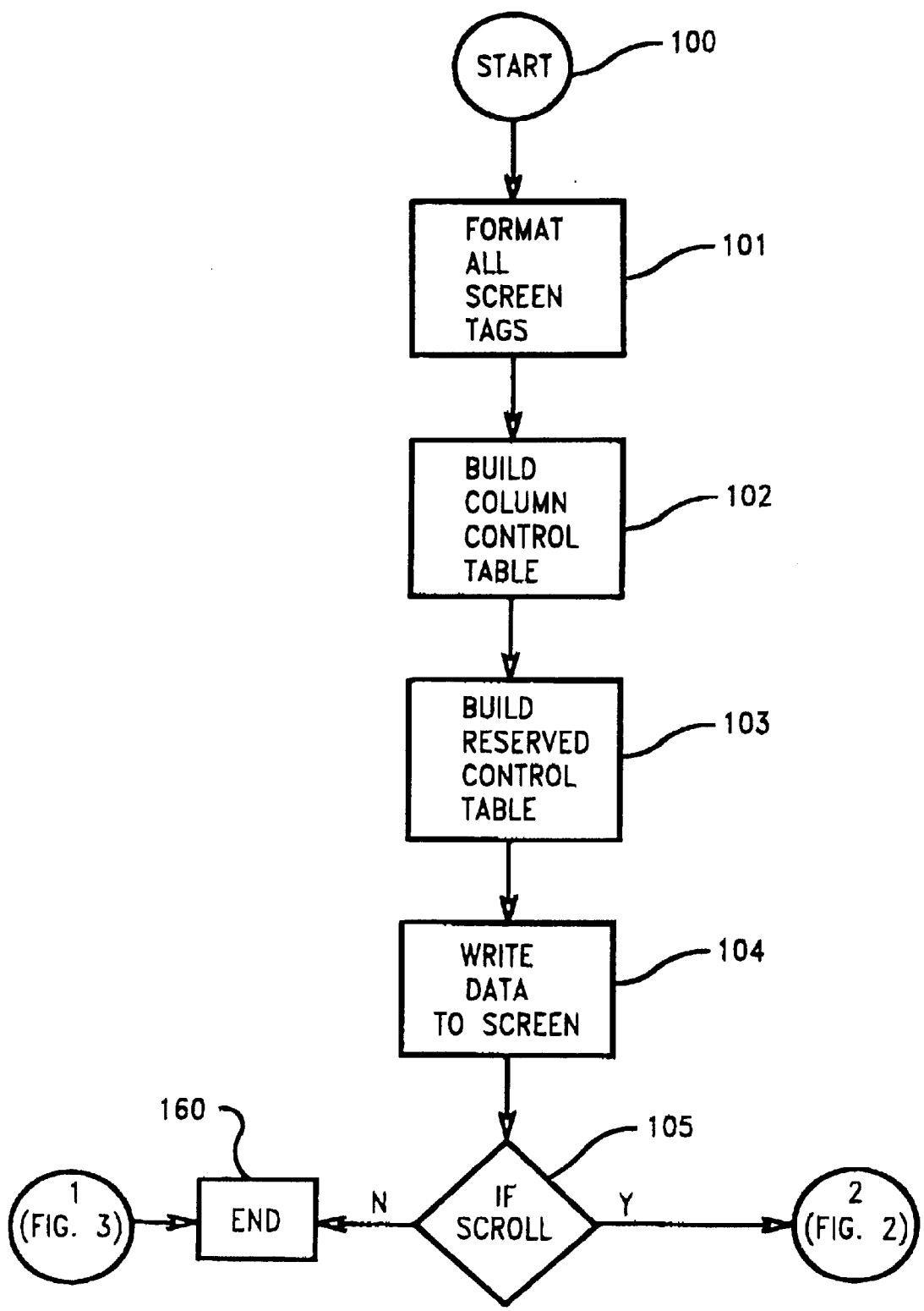
FIGS. 1–3 depict flow charts describing the preferred process incorporated in the computer program of the present invention, the flow charts and figures being linked by the numbers in circles.

In describing the preferred embodiment of the present invention, reference will be made herein to FIGS. 1–4 of the drawings in which like numerals refer to like features of the invention. Features of the invention are not necessarily shown to scale in the drawings.

The object of this invention is to charge the way web browsers interact with HTML files to allow for columns of row headings to be defined as non-scrollable so that the headings will always be visible as the data rows are scrolled to the left or to the right. The invention will also allow multiple non-scrollable row headings to be in an adjacent position and to allow certain row headings to displace other columns of row headings when they are in an adjacent position.

This can be accomplished by introducing a new HTML tag, referred to as the column scroll tag, that identifies a column of row headings in a file as non-scrollable depending on the screen position of the column. When there is a column of headings that reach the left-most position of the screen, the columns become locked and remain on the screen. There may be N number of non-scrollable columns in a file. Each non-scrollable column of row headings is in effect for a limited number of rows. A column scroll tag also has the property of displacement or no displacement. Displacement means that once two non-scrollable columns are adjacent, the right-most non-scrollable column would immediately displace the left-most column non-scrollable column, when the data is scrolled to the left on a screen. When the data is scrolled to the right on a screen, displacement means that once two non-scrollable columns are adjacent, the left-most non-scrollable column would immediately displace the right-most column non-scrollable column, when the data is scrolled to the left on a screen. Non-displacement means that when two columns are adjacent and at the left-most or right-most column positions, they both become locked in such screen positions.

The present invention utilizes a new HTML tag called "rscroll" that identifies the next N columns in a file as non-scrollable. The web browser then keeps track of the position of the column with the "rscroll" HTML tag and when the column reaches the left of the browser screen, the browser locks the non-scrollable row headings but allows the scrolling of the data rows while preserving the non-scrollable row headings.

The condition of multiple sets of headings is controlled by the browser, which keeps track of these headings as they are scrolled. When the second set of headings with the "rscroll" tag reaches the point where it is just to the right of the right-most column of non-scrollable headings the browser will immediately position the second set of headings at the left-most position of the browser and allow the continued scrolling of the file while preserving the set of row headings. This process also works in reverse as the file is scrolled in the opposite direction.

An example of a column scroll tag with displacement indicator is as follows:

---

<col scroll displacement> Text to be locked goes here. </col scroll>

---

The first part of the column scroll tag is placed directly to the top and left of the column in the HTML source file that is to be marked non-scrollable. The last part of the column scroll tab is placed directly to the bottom right of the column in the HTML source file that is to be marked non-scrollable.

This invention requires only one file for the HTML source file and does not require special coding in the HTML source file to tie every file together.

The present invention also provides for interaction between columns that varies, depending on how the columns are defined. Such columns may be defined as having a displacement or a no-displacement property.

The following terms have the indicated meanings as used herein:
HTML—Hypertext Markup Language.
HTML tag—HTML markup tags.
HTML source file—File with the HTML tags to be converted by a web browser to be displayed on a monitor.
HTML file—File that has been formatted by the web browser and will be displayed on a monitor.
SCREEN—Portion of the HTML file that the viewer sees when a web browser displays the HTML file on the monitor.
COLUMN CONTROL TABLE—A table that contains the absolute row lines and column pairs with a displacement property indicator for each column pair. An example of such table is shown in Table 8.
RESERVED CONTROL TABLE—A table that contains the screen row numbers, the absolute row lines, absolute column numbers, and the screen column number.
COLUMN SCROLL TAG—An HTML tag that defines columns of data of an HTML source file that when displayed on a screen, appear to be non-scrollable depending on the position of the columns of data relative to the position on the screen. The column scroll tag also has the properties of displacement or non-displacement. Displacement means that once two non-scrollable columns are adjacent, the right-most non-scrollable column would immediately displace the left-most column of non-scrollable column. Non-displacement means that when two columns are adjacent and at the left-most column positions they both become locked.
SCREEN COLUMN NUMBERS—The numbers of each column of the screen, beginning at 1 and proceeding in sequence to the last column that is to be written to the screen.
ABSOLUTE COLUMN NUMBERS—The numbers of each column of the HTML file, starting at one and proceeding in sequence to the far right of the HTML file.
LOCKED—One or more columns that do not move on the monitor when the screen presented by a web browser is scrolled to the left. It also refers to the columns that do not move when the data is scrolled to the right provided the original position of the locked columns relative to the other columns is located at the extreme left of the screen. A column may also remains locked as the screen is scrolled to the right depending on the position of the column with respect to the HTML file.
ABSOLUTE ROW LINES—The numbers of each row of the HTML file, starting at one and proceeding in sequence to the end of the HTML file
COLUMN PAIRS—The beginning column and ending column of a row heading that is part of a non-scrollable column.
SCREEN ROW NUMBERS—The numbers of the rows of data or lines of data that appear on the screen. The top row is row number 1 and each succeeding row is numbered consecutively.

Tables 5, 6, and 7 below illustrate the action of two non-scrollable columns of row headings with the first column having a property of no-displacement. Table 5 shows a screen that has two columns of row headings immediately to the right of arrow "A". Arrow "B" is for a point of reference as the data on the screen is scrolled to the left.

TABLE 5

VIEWING OF THE DOCUMENT WITH COLUMN CONTROL

| | | | | | | | | | Weekend Huskie Production | | | | |
|---|---|---|---|---|---|---|---|---|---|---|---|---|---|
| | | | | Day of Day | | | | | Week 1 | | | | |
| | | | | 5  24 | | | | | | | | | |
| | | | Part# 16G5736 Huskie 64 mm | | | | | | Customer: PQ Level  L | | | | |
| Cum | | WTD | Sect | Sector | | Lam | Daily | Mtd | Schd | Mtd | Delt | Wip | Wip |
| C/T | C/T | C/T | # | Name | Adr | Ship | Ship | Plan | Actual | Delt | Day | Lam | Actu |
| 19.8 | 1.0 | 1.1 | 9611 | TSM Depo | 25 | | | 125 | 105 | −20 | −0.8 | 8 | 3 |
| 18.8 | 1.0 | 1.7 | 9621 | TSM Phot | 26 | 2 | 8 | 130 | 50 | −80 | −3.1 | 26 | 9 |
| 17.8 | 0.7 | 0.3 | 9631 | TSM Meta | 25 | | | 125 | 42 | −83 | −3.3 | 2 | |
| 17.1 | 0.5 | 1.3 | 9681 | TSM Etch | 26 | | | 130 | 30 | −100 | −3.8 | 15 | 5 |
| 16.6 | 0.7 | 1.8 | 9691 | TSM Meas | 26 | | | 130 | 44 | −86 | −3.3 | | |
| 15.9 | 1.1 | 1.1 | 9701 | Elect Te | 19 | | | 95 | 59 | −36 | −1.9 | 1 | |
| 14.8 | 2.4 | 4.2 | 9711 | Rep.Sols | 18 | 1 | 4 | 90 | 119 | 29 | 1.6 | 10 | 3 |
| 12.4 | 0.7 | 2.2 | 9721 | TSM Poly | 19 | 4 | 10 | 95 | 96 | 1 | 0.1 | 20 | 5 |
| 11.7 | | 0.4 | 9731 | Substock | 20 | | | 100 | 122 | 22 | 1.1 | 4 | |
| 11.7 | 5.4 | 2.8 | 9733 | New B-I | 20 | | | 100 | 181 | 81 | 4.1 | 46 | 10 |
| 6.3 | | 1.4 | 9737 | Substock | 21 | | | 105 | 140 | 35 | 1.7 | 24 | 6 |
| 6.3 | 0.4 | 1.5 | 9741 | ECLAT | 21 | 8 | 18 | 105 | 141 | 36 | 1.7 | 3 | |
| 5.9 | 0.3 | 0.2 | 9745 | BSM Au | 21 | 8 | 18 | 105 | 141 | 36 | 1.7 | | |
| 5.6 | 0.3 | 2.6 | 9751 | Laser Et | 25 | | | 125 | 181 | 56 | 2.2 | 27 | 6 |
| 5.3 | 0.7 | 0.8 | 9761 | SBDepos | 25 | 11 | 32 | 125 | 205 | 80 | 3.2 | | |
| 4.6 | 1.0 | 1.0 | 9841 | C4 Plate | 26 | | | 130 | 143 | 13 | 0.5 | 39 | 9 |
| 3.6 | 0.3 | 0.7 | 9851 | Photo Pr | 27 | 22 | 64 | 135 | 158 | 23 | 0.9 | | |
| 3.3 | 0.5 | 0.4 | 9855 | Dice | 26 | | | 130 | 94 | −36 | −1.4 | 22 | 6 |
| 2.8 | 0.2 | 0.0 | 9857 | Job Spli | 26 | N/A | | 130 | 105 | −25 | −1.0 | N/A | |
| 2.6 | 0.3 | 0.8 | 9861 | P/R Remo | 26 | N/A | | 130 | 118 | −12 | −0.5 | N/A | |
| 2.3 | 0.4 | 0.5 | 9871 | Pstb/iEm | 24 | N/A | | 120 | 112 | −8 | −0.3 | N/A | |
| 1.9 | 0.1 | | 9875 | Data Ver | | N/A | | | 121 | 121 | na | N/A | |
| 1.8 | 0.3 | 0.5 | 9881 | Prbraz I | 24 | N/A | 7 | 120 | 117 | −3 | −0.1 | N/A | |
| 1.5 | | | 9707 | SBandRwk | | N/A | | | | | na | N/A | |
| 1.5 | | | 9715 | Braze Rw | | N/A | | | | | na | N/A | |
| 1.5 | 0.5 | 0.7 | 9901 | Pin Atta | 23 | N/A | | 115 | 106 | −9 | −0.4 | N/A | 1 |
| 1.0 | | 2.8 | 9001 | BPol.Rwk | | N/A | | | 1 | 1 | na | N/A | |
| 1.0 | | | 9309 | BSMPadE | | N/A | 1 | | 1 | 1 | na | N/A | |
| 1.0 | 0.3 | 0.3 | 9903 | BSM Insp | 23 | N/A | 8 | 115 | 106 | −9 | −0.4 | N/A | |
| 0.7 | 0.7 | 5.5 | 9915 | Final In | 28 | N/A | | 140 | 130 | −10 | −0.4 | N/A | 10 |
| | | | 9995 | Pok Sub. | | | | YTD | 2847 | | | | |
| | | | | Totals | | | | 672 | 130 | −542 | | 247 | 81 |

| Total Reqs. | | | | | | | |
|---|---|---|---|---|---|---|---|
| | 05/02 | 05/09 | 05/16 | 05/23 | 05/30 | 06/0 | |
| | Complete | 180 | 327 | 457 | 653 | 85 | |
| Prime Reqs. | Complete | 153 | 270 | 370 | 536 | 72 | |

Table 6 shows a screen that has begun to have the data scrolled to the left. Arrows "A" and "B" show that the data has all been scrolled to the left and that the two columns of row headings that are to be locked appear at the extreme left of the screen.

TABLE 6

BEGINNING OF RIGHT SCREEN SCROLL WITH COLUMN CONTROL

| | | | | | | | Weekend Huskie Production and Yield Stat | | | | | | |
|---|---|---|---|---|---|---|---|---|---|---|---|---|---|
| | | Day of Day | | | | | Week 1 | | | | | | |
| | | 5  24 | | | | | | | | | | | |
| | | 5736 Huskie 64 mm | | | | | Customer: PQ Level L. Rapp 4up | | | | | | |
| Sect | Sector | | Lam | Daily | Mtd | Schd | Mtd | Delt | Wip | Wip | Yield | Cum | Schedu |
| # | Name | Adr | Ship | Ship | Plan | Actual | Delt | Day | Lam | Actual | Wip | Wip | Yield |
| 9611 | TSM Depo | 25 | | | 125 | 105 | −20 | −0.8 | 8 | 31 | 21 | 702 | 99.7 |
| 9621 | TSM Phot | 26 | 2 | 8 | 130 | 50 | −80 | −3.1 | 26 | 94 | 65 | 681 | 100.0 |
| 9631 | TSM Meta | 25 | | | 125 | 42 | −83 | −3.3 | 2 | 8 | 6 | 616 | 99.6 |
| 9681 | TSM Etch | 26 | | | 130 | 30 | −100 | −3.8 | 15 | 51 | 35 | 610 | 98.8 |
| 9691 | TSM Meas | 26 | | | 130 | 44 | −86 | −3.3 | | | | 575 | 99.8 |
| 9701 | Elect Te | 19 | | | 95 | 59 | −36 | −1.9 | 1 | 1 | 1 | 575 | 90.1 |
| 9711 | Rep.Sols | 18 | 1 | 4 | 90 | 119 | 29 | 1.6 | 10 | 34 | 27 | 574 | 88.6 |
| 9721 | TSM Poly | 19 | 4 | 10 | 95 | 96 | 1 | 0.1 | 20 | 53 | 47 | 548 | 99.8 |
| 9731 | Substock | 20 | | | 100 | 122 | 22 | 1.1 | 4 | 8 | 7 | 501 | 99.6 |
| 9733 | New B-I | 20 | | | 100 | 181 | 81 | 4.1 | 46 | 106 | 94 | 494 | 99.9 |
| 9737 | Substock | 21 | | | 105 | 140 | 35 | 1.7 | 24 | 63 | 56 | 399 | 100.0 |
| 9741 | ECLAT | 21 | 8 | 18 | 105 | 141 | 36 | 1.7 | 3 | 9 | 8 | 343 | 99.9 |
| 9745 | BSM Au | 21 | 8 | 18 | 105 | 141 | 36 | 1.7 | | | | 335 | 100.0 |
| 9751 | Laser Et | 25 | | | 125 | 181 | 56 | 2.2 | 27 | 69 | 61 | 335 | 99.8 |
| 9761 | SBDepos | 25 | 11 | 32 | 125 | 205 | 80 | 3.2 | | | | 274 | 100.0 |

TABLE 6-continued

BEGINNING OF RIGHT SCREEN SCROLL WITH COLUMN CONTROL

| | | Day of 5 | Day 24 | | | | Weekend Huskie Production and Yield Stat Week 1 | | | | | |
|---|---|---|---|---|---|---|---|---|---|---|---|---|
| | | 5736 Huskie 64 mm | | | | | Customer: PQ Level L. Rapp 4up | | | | | |
| Sect # | Sector Name | Adr | Lam Ship | Daily Ship | Mtd Plan | Schd Actual | Mtd Delt | Delt Day | Wip Lam | Wip Actual | Yield Wip | Cum Wip | Schedu Yield |
| 9841 | C4 Plate | 26 | | | 130 | 143 | 13 | 0.5 | 39 | 97 | 87 | 274 | 100.0 |
| 9851 | Photo Pr | 27 | 22 | 64 | 135 | 158 | 23 | 0.9 | | | | 187 | 100.0 |
| 9855 | Dice | 26 | | | 130 | 94 | −36 | −1.4 | 22 | 61 | 54 | 187 | 99.9 |
| 9857 | Job Spli | 26 | N/A | | 130 | 105 | −25 | −1.0 | N/A | | | 133 | 99.7 |
| 9861 | P/R Remo | 26 | N/A | | 130 | 118 | −12 | −0.5 | N/A | 1 | 1 | 133 | 100.0 |
| 9871 | Pstb/iEm | 24 | N/A | | 120 | 112 | −8 | −0.3 | N/A | | | 132 | 90.4 |
| 9875 | Data Ver | | N/A | | | 121 | 121 | na | N/A | | | 132 | 100.0 |
| 9881 | Prbraz I | 24 | N/A | 7 | 120 | 117 | −3 | −0.1 | N/A | 6 | 6 | 132 | 100.0 |
| 9707 | SBandRwk | | N/A | | | | | na | N/A | | | 126 | 100.0 |
| 9715 | Braze Rw | | N/A | | | | | na | N/A | 4 | 4 | 126 | 100.0 |
| 9901 | Pin Atta | 23 | N/A | | 115 | 106 | −9 | −0.4 | N/A | 18 | 18 | 122 | 99.9 |
| 9001 | BPol.Rwk | | N/A | | | 1 | 1 | na | N/A | 2 | 2 | 104 | 100.0 |
| 9309 | BSMPadE | | N/A | 1 | | 1 | 1 | na | N/A | | | 102 | 100.0 |
| 9903 | BSM Insp | 23 | N/A | 8 | 115 | 106 | −9 | −0.4 | N/A | 2 | 2 | 102 | 99.8 |
| 9915 | Final In | 28 | N/A | | 140 | 130 | −10 | −0.4 | N/A | 101 | 100 | 100 | 99.4 |
| 9995 | Pok Sub. | | | | YTD | 2847 | | | | 1 | 1 | 1 | 100.0 |
| | Totals | | | | 672 | 130 | −542 | | 247 | 819 | 702 | | 69.3 |
| | | | | | | | | | | | Cum Totals | | 57.3 |
| 5/02 | | 05/09 | | 05/16 | | 05/23 | | 05/30 | | 06/06 | | ***** | |
| Complete | | 180 | | 327 | | 457 | | 653 | | 853 | | 1053 | |
| Complete | | 153 | | 270 | | 370 | | 536 | | 724 | | 912 | |

Table 7 shows that the two columns of row headings have remained in place as the data has continued to scroll to the left.

TABLE 7

CONTINUE RIGHT SCREEN SCROLL WITH COLUMN CONTROL

| | | Day of 5 | Day 24 | | | | Weekend Huskie Production and Yield Status Week 1 | | | | | |
|---|---|---|---|---|---|---|---|---|---|---|---|---|
| | 5736 Huskie | | Customer: PQ Level | | | L. Rapp 4up | | | Date 05-May 1997 | | | |
| Sect # | Sector Name | Mtd Plan | Schd Actual | Mtd Delt | Delt Day | Wip Lam | Wip Actual | Yield Wip | Cum Wip | Schedul Yield | Daily Yield | Mtd Yield | 4 |
| 9611 | TSM Depo | 125 | 105 | −20 | −0.8 | 8 | 31 | 21 | 702 | 99.7% | 100.0% | 100.0% | |
| 9621 | TSM Phot | 130 | 50 | −80 | −3.1 | 26 | 94 | 65 | 681 | 100.0% | 100.0% | 100.0% | |
| 9631 | TSM Meta | 125 | 42 | −83 | −3.3 | 2 | 8 | 6 | 616 | 99.6% | 100.0% | 100.0% | |
| 9681 | TSM Etch | 130 | 30 | −100 | −3.8 | 15 | 51 | 35 | 610 | 98.8% | 100.0% | 100.0% | |
| 9691 | TSM Meas | 130 | 44 | −86 | −3.3 | | | | 575 | 99.8% | 100.0% | 95.7% | |
| 9701 | Elect Te | 95 | 59 | −36 | −1.9 | 1 | 1 | 1 | 575 | 90.1% | 100.0% | 90.8% | |
| 9711 | Rep.Sols | 90 | 119 | 29 | 1.6 | 10 | 34 | 27 | 574 | 88.6% | 100.0% | 81.5% | |
| 9721 | TSM Poly | 95 | 96 | 1 | 0.1 | 20 | 53 | 47 | 548 | 99.8% | 100.0% | 100.0% | |
| 9731 | Substock | 100 | 122 | 22 | 1.1 | 4 | 8 | 7 | 501 | 99.6% | 100.0% | 100.0% | |
| 9733 | New B-I | 100 | 181 | 81 | 4.1 | 46 | 106 | 94 | 494 | 99.9% | 100.0% | 100.0% | |
| 9737 | Substock | 105 | 140 | 35 | 1.7 | 24 | 63 | 56 | 399 | 100.0% | 100.0% | 100.0% | |
| 9741 | ECLAT | 105 | 141 | 36 | 1.7 | 3 | 9 | 8 | 343 | 99.9% | 100.0% | 100.0% | |
| 9745 | BSM Au | 105 | 141 | 36 | 1.7 | | | | 335 | 100.0% | 100.0% | 100.0% | |
| 9751 | Laser Et | 125 | 181 | 56 | 2.2 | 27 | 69 | 61 | 335 | 99.8% | 100.0% | 99.5% | |
| 9761 | SBDepos | 125 | 205 | 80 | 3.2 | | | | 274 | 100.0% | 100.0% | 100.0% | |
| 9841 | C4 Plate | 130 | 143 | 13 | 0.5 | 39 | 97 | 87 | 274 | 100.0% | 100.0% | 100.0% | |
| 9851 | Photo Pr | 135 | 158 | 23 | 0.9 | | | | 187 | 100.0% | 100.0% | 100.0% | |
| 9855 | Dice | 130 | 94 | −36 | −1.4 | 22 | 61 | 54 | 187 | 99.9% | 100.0% | 100.0% | |
| 9857 | Job Spli | 130 | 105 | −25 | −1.0 | N/A | | | 133 | 99.7% | 100.0% | 100.0% | |
| 9861 | P/R Remo | 130 | 118 | −12 | −0.5 | N/A | 1 | 1 | 133 | 100.0% | 100.0% | 100.0% | |
| 9871 | Pstb/iEm | 120 | 112 | −8 | −0.3 | N/A | | | 132 | 90.4% | 100.0% | 94.1% | |
| 9875 | Data Ver | | 121 | 121 | na | N/A | | | 132 | 100.0% | 100.0% | 100.0% | |
| 9881 | Prbraz I | 120 | 117 | −3 | −0.1 | N/A | 6 | 6 | 132 | 100.0% | 100.0% | 99.2% | |
| 9707 | SBandRwk | | | | na | N/A | | | 126 | 100.0% | 100.0% | 100.0% | |
| 9715 | Braze Rw | | | | na | N/A | 4 | 4 | 126 | 100.0% | 100.0% | 100.0% | |
| 9901 | Pin Atta | 115 | 106 | −9 | −0.4 | N/A | 18 | 18 | 122 | 99.9% | 100.0% | 100.0% | |
| 9001 | BPol.Rwk | | 1 | 1 | na | N/A | 2 | 2 | 104 | 100.0% | 100.0% | 100.0% | |
| 9309 | BSMPadE | | 1 | 1 | na | N/A | | | 102 | 100.0% | 100.0% | 100.0% | |
| 9903 | BSM Insp | 115 | 106 | −9 | −0.4 | N/A | 2 | 2 | 102 | 99.8% | 100.0% | 100.0% | |

TABLE 7-continued

CONTINUE RIGHT SCREEN SCROLL WITH COLUMN CONTROL

|  |  |  | Day of 5 | Day 24 |  |  | Weekend Huskie Production and Yield Status Week 1 |  |  |  |  |  |  |
|---|---|---|---|---|---|---|---|---|---|---|---|---|---|
|  |  | 5736 Huskie |  | Customer: PQ Level |  |  |  | L. Rapp 4up |  | Date 05-May 1997 | | | |
| Sect # | Sector Name | Mtd Plan | Schd Actual | Mtd Delt | Delt Day | Wip Lam | Wip Actual | Yield Wip | Cum Wip | Schedul Yield | Daily Yield | Mtd Yield | 4 |
| 9915 | Final In | 140 | 130 | −10 | −0.4 | N/A | 101 | 100 | 100 | 99.4% | 100.0% | 99.2% | |
| 9995 | Pok Sub. | YTD | 2847 |  |  |  | 1 | 1 | 1 | 100.0% | 100.0% | 100.0% | |
|  | Totals |  | 672 | 130 | −542 |  | 247 | 819 | 702 |  | 69.3% | 100.0% | 65.2% |
|  |  |  |  |  |  |  |  |  | Cum Totals | 57.3% | 100.0% | 42.0% | |
| 5/02 |  | 0 |  | 05/23 |  | 05/30 |  | 06/06 | ***** |  | 06/20 |  | |
| Complete |  |  |  | 457 |  | 653 |  | 853 | 1053 |  | 1062 |  | |
| Complete |  |  |  | 370 |  | 536 |  | 724 | 912 |  | 909 |  | |

Figure 2:
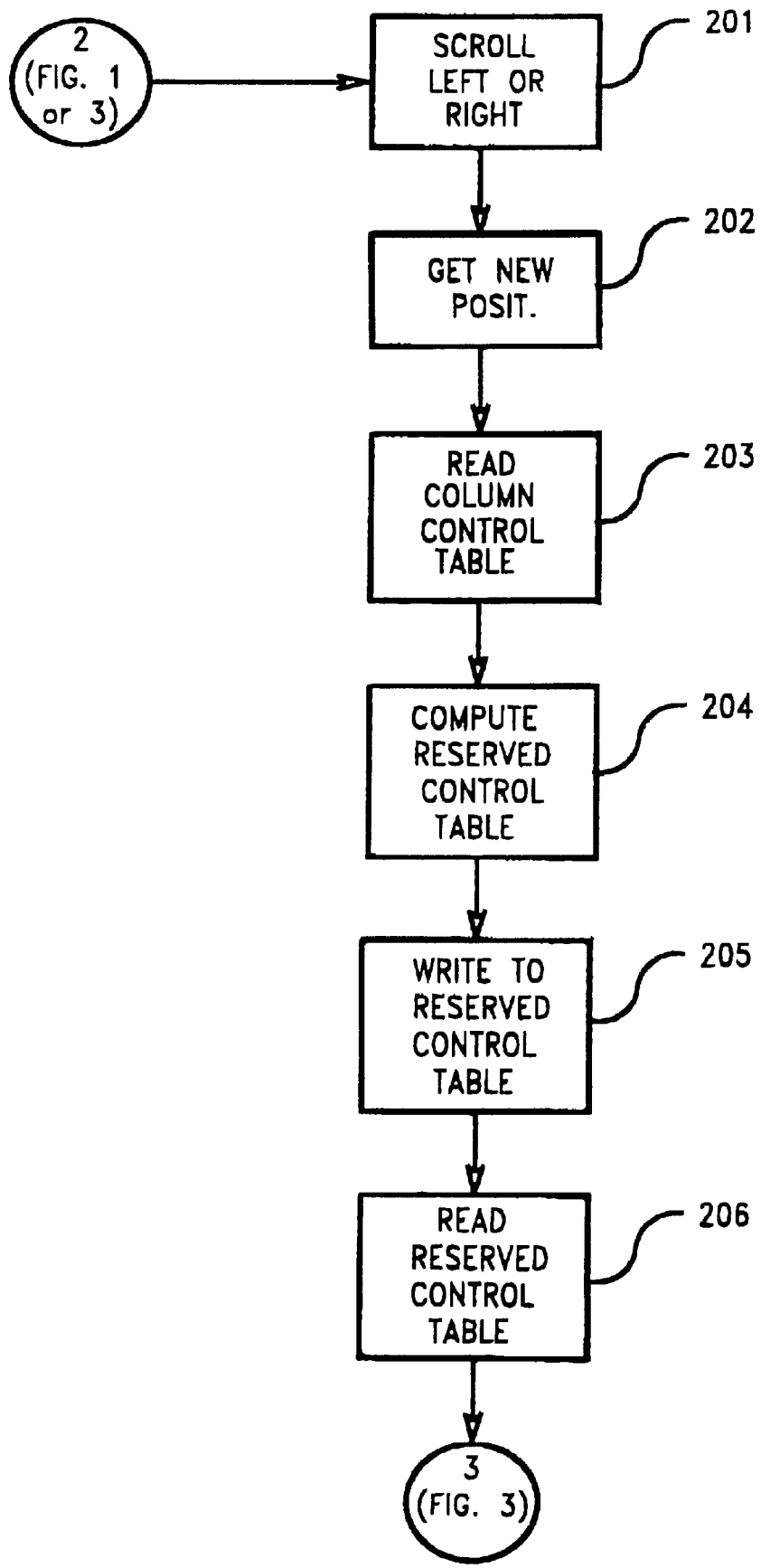
Figure 3:
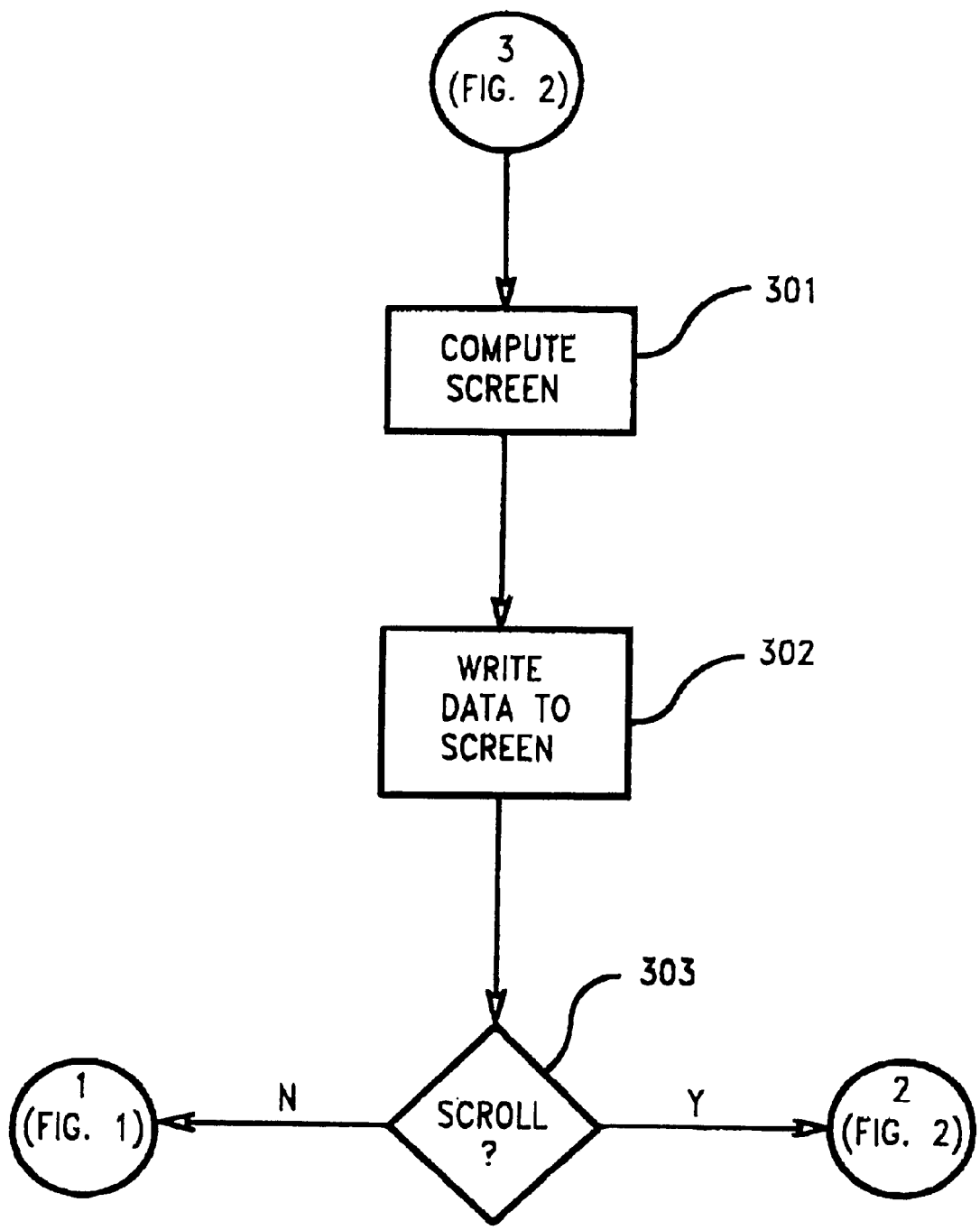

FIGS. 1–3 depict flow charts describing the preferred process of the present invention, as follows:

100—Start.

101—Format all scroll tags. Identify all of the column scroll tags present in the HTML source.

102—Build the column control table. Include each absolute row lines column pairs and the displacements for each column pair.

103—Build the reserved control table consisting of the screen row numbers, absolute row lines, absolute column numbers, and the screen column numbers. See table 9–16 for examples.

104—Write the data to the screen.

105—If scroll? Does the user wish to scroll?

201—Scroll left or scroll right.

202—Get the new position. Get the number of columns that have been scrolled and the direction, left or right.

203—Read the column control table to see the effect of scrolling.

204—Compute the new reserved table.

Table 8 below contains the absolute row lines and column pairs with a displacement property indicator for each column pair.

TABLE 8

COLUMN CONTROL TABLE

| Absolute row lines | Columns Pairs | | | |
|---|---|---|---|---|
| 5 | 20-25 d | 30-35 n | 40-45 d | 55-58 d |
| 6 | 20-25 d | 30-35 n | 40-45 d | 55-58 d |
| 7 | 20-25 d | 30-35 n | 40-45 d | 55-58 d |
| 8 | 20-25 d | 30-35 n | 40-45 d | 55-58 d |
| 9 | 20-25 d | 30-35 n | 40-45 d | 55-58 d |
| 10 | 20-25 d | 30-35 n | 40-45 d | 55-58 d |
| 11 | 20-25 d | 30-35 n | 40-45 d | 55-58 d |
| 12 | 20-25 d | 30-35 n | 40-45 d | 55-58 d |

Tables 10–16 are examples of scrolling N numbers of columns and resulting absolute column numbers that are computed in the reserved table. In these tables, the screen row numbers go only from 1 to 8, i.e., the screens contain only 8 rows of data, for simplification only. The actual screen normally continues to at least 24 rows.

Tables 9–16 are reserve control tables after the screen on the HTML file has been scrolled downward to absolute row line 5. Table 9 is the reserved control table starting position.

TABLE 9

RESERVED CONTROL TABLE STARTING POSITION

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
00000000011111111112222222222333333333344444444445555555555666666666677 7
123456789012345678901234567890123456789012345678901234567890123456789012
Screen Column Numbers
00000000011111111112222222222333333333344444444445555555555666666666677 7
123456789012345678901234567890123456789012345678901234567890123456789012

Table 10 shows the computed reserved table after the screen on the HTML file has been scrolled four (4) columns to the right. Since the column control table indicated that there are no column pairs that would be in the left-most position of the screen, the absolute column numbers in table 2 are shifted four (4) columns to the left.

column pair 20–25 has a "d" next to it. This indicates that the column pair can be displaced by another column pair. Scrolling 10 columns has moved column pair 30–35 to the left-most position of the screen as indicated by the absolute column numbers.

TABLE 10

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
00000111111111222222222233333333334444444444555555555566666666667777777
56789012345678901234567890123456789012345678901234567890123456789012345 6
Screen Column Numbers
00000000011111111112222222222333333333344444444445555555555666666666677 7
12345678901234567890123456789012345678901234567890123456789012345678901 2

Table 11 shows the effects of the screen scrolling 19 columns of data to the right on the HTML file. The column control table indicates that the column pair 20–25 would now be in the left-most position of the screen.

TABLE 11

| RESERVED CONTROL TABLE, SCREEN SCROLL 19 RIGHT | |
|---|---|
| Screen row numbers | absolute row lines |
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
22222222223333333333444444444455555555556666666666777777777708888888888
01234567890123456789012345678901234567890123456789012345678901234567 89
Screen Column Numbers
00000000011111111112222222222333333333344444444445555555555666666666677 7
12345678901234567890123456789012345678901234567890123456789012345678901 2

Table 12 shows the effects of the screen scrolling 10 more columns to the right on the HTML file. Notice that the

TABLE 12

| RESERVED CONTROL TABLE, SCREEN SCROLL 10 RIGHT | |
|---|---|
| Screen row numbers | Absolute row lines |
| 1 | 5 |
| 2 | 6 |
| 3 | 7 |

TABLE 12-continued

RESERVED CONTROL TABLE, SCREEN SCROLL 10 RIGHT

| | |
|---|---|
| 4 | 8 |
| 5 | 9 |
| 6 | 10 |
| 7 | 11 |
| 8 | 12 |

Absolute column numbers
3333333333444444444455555555556666666666777777777708888888889999999999
0123456789012345678901234567890123456789012345678901234567890123456789
Screen Column Numbers
00000000001111111111222222222233333333334444444444555555555566666666667777
1234567890123456789012345678901234567890123456789012345678901234567890128

Table 13 shows the effects of scrolling the screen 4 columns to the right on the HTML file. Notice that absolute column numbers 30–35 are locked and the other columns have scrolled so that absolute column number 40 is now adjacent to column 35. pairs 30–35 do not move and column pairs 40–45 are adjacent to them. This is because column pairs 30–35 cannot be displaced as indicated by the displacement property of "n" in the column control table. The scrolling results in

TABLE 13

RESERVED CONTROL TABLE, SCREEN SCROLL 4 RIGHT

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
3333334444444444555555555566666666667777777777088888888889999999999
0123450123456789012345678901234567890123456789012345678901234567890123456789
Screen Column Numbers
00000000001111111111222222222233333333334444444444555555555566666666667777
1234567890123456789012345678901234567890123456789012345678901234567890128

*note: columns 30–35 are locked.

Table 14 shows the effects of the screen scrolling 5 columns to the right on the HTML file. Note that column absolute column number 51 being adjacent to the column pair 40–45.

TABLE 14

RESERVED CONTROL TABLE, SCREEN SCROLL 5 RIGHT

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
3333334444445555555555666666666677777777770888888888899999999999
01234501234512345678901234567890123456789012345678901234567890123456789
Screen Column Numbers

TABLE 14-continued

RESERVED CONTROL TABLE, SCREEN SCROLL 5 RIGHT 00000000011111111112222222222333333333344444444445555555555666666666777
12345678901234567890123456789012345678901234567890123456789012345678901

*note: columns 30–35 are locked and columns 40–45 cannot displace
*them.

Scrolling the screen 4 more columns to the right on the HTML file will be described in Tables 15 and 16. Table 15 indicates that column pair 55–58 becomes adjacent to column pair 40–45. When this happens an immediate displacement of column pair 40–45 by 55–58 will take place because column pair 40–45 has the property of displacement as indicated by the column control table.

Table 16 shows the result of two column pairs becoming adjacent and the left-most one having the displacement property.

TABLE 15

RESERVED CONTROL TABLE, SCREEN SCROLL 4 RIGHT

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
33333344444455556666666666777777777708888888889999999999
0123450123456789012345678901234567890123456789012345678 9
Screen Column Numbers
00000000011111111112222222222333333333344444444445555555555666666666777
12345678901234567890123456789012345678901234567890123456789012345678901

*note: columns 40–45 will be displaced when the next column scroll
*is adjacent to the rightmost column of the previous column scroll
*which is column 45.

TABLE 16

RESERVED CONTROL TABLE, SCREEN SCROLL 4 RIGHT

| Screen row numbers | Absolute row lines |
|---|---|
| 1 | 5 |
| 2 | 6 |
| 3 | 7 |
| 4 | 8 |
| 5 | 9 |
| 6 | 10 |
| 7 | 11 |
| 8 | 12 |

Absolute column numbers
333333555666666666677777777770888888888 89999999999
0123455678901234567890123456789012345678 9
Screen Column Numbers
00000000011111111112222222222333333333344444444445555555555666666666777
12345678901234567890123456789012345678901234567890123456789012345678901

*note: columns 40–45 have been displaced when the next column scroll

TABLE 16-continued

RESERVED CONTROL TABLE, SCREEN SCROLL 4 RIGHT

*is adjacent to the rightmost column of the previous column scroll
*which is column 45. Columns 30–35 remain locked.
*them.

Continuing the description of the process of the present invention, reference should be made to FIGS. 2 and 3:

205—Write the results to the reserved control table. The results of the computations are written to the reserved control table.

206—Read the reserve control table.

301—Compute the screen. Use the reserve control table data to compute what is to be shown on the screen. The reserved control table has the absolute column numbers of the HTML file, the absolute row lines the screen column numbers, and the screen row numbers. This information is used to compute what is displayed on the screen.

302—Write the data to the screen. Take the results of the screen computation and write the data to the screen.

303—Scroll? Does the user wish to scroll again?

Figure 4:
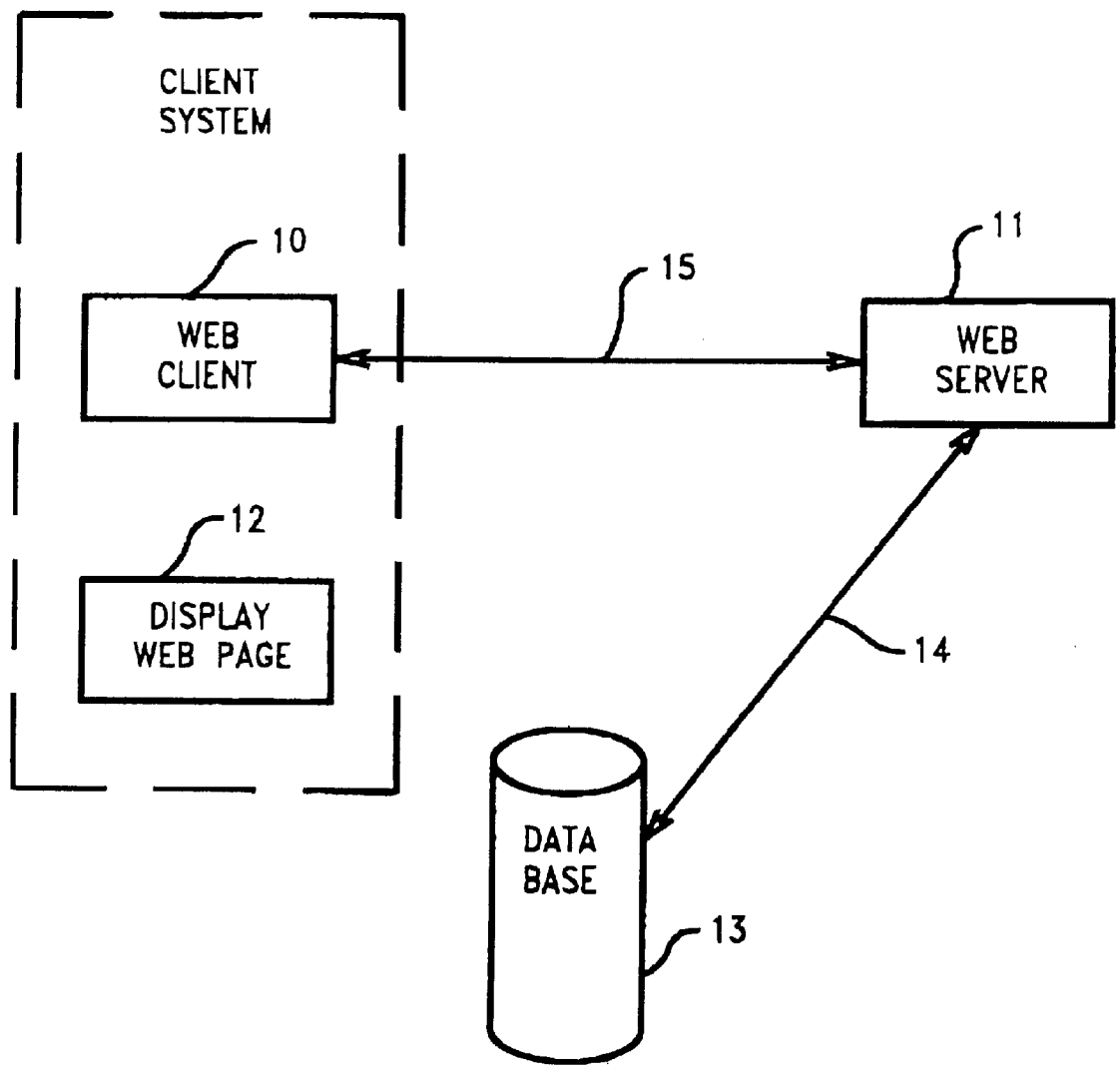
FIG. 4 is a schematic of the system of the present invention for displaying multiple information and headings on a computer screen using an inter- or intra-net web browser.

A typical client/network system is illustrated in FIG. 4. A client system comprises a client computer 10 and a display screen 12 for displaying web pages. Client computer 10 is linked by telephone or other network cable 15 to a server computer 11 on an inter- or intra-net. Web server 11 is linked 14 to data base 13 which provides the data file containing a data heading column and a plurality of data columns associated with the heading column. Client computer 10 incorporates the web browser and software instructors described above in a conventional program storage device. The data heading column and plurality of data columns, such as those described in the aforementioned tables, may be displayed on screen 12 in the manner previously illustrated.

The invention may utilize a program storage device readable by a computer or other machine, such as a magnetic disk drive, diskette or tape, an optical disk, read-only memory or direct access storage device. The program storage device tangibly embodies and contains the program of instructions, in accordance with the present invention, executable by the machine to perform the aforementioned methods of visually displaying multiple information and row headings on a computer screen using an inter- or intra-net web browser. The web browser may be any commercially available web browser computer program which interprets, HTML commands to collect, arrange and display parts of a web page, such as Netscape Navigator.

Thus, the present invention provides a method and system usable on an inter- or intra-net web browser for scrolling data across and off a computer screen while data file headings are locked on a side position of the screen, as well as providing for sequentially locking in multiple data file headings on a side position of a computer screen.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for visually displaying multiple information and row headings on a computer screen using an inter- or intra-net web browser comprising the steps of:

a) providing a data file having a first data heading column and a plurality of data columns associated with said first data heading column;

b) identifying said first data heading column with a non-displaceable HTML tag;

c) locking said first data heading column on a side position of said computer screen;

d) scrolling said data columns across and off said screen while said first data heading column is locked on the side screen position; and e) scrolling a second data heading column across said screen until said second data heading column is locked adjacent the first data heading column, such that the first and second data heading columns remain locked in the side screen position.

2. The process of claim 1 wherein said HTML tag is a scroll tag comprising hypertext markup language.

3. The process of claim 1 wherein said data heading column comprises a plurality of columns containing data headings, and wherein in steps (c) and (d) the plurality of data. heading columns are locked in said side screen position.

4. The process of claim 1 wherein each of said data heading and data columns contain multiple rows.

5. The process of claim 1 including the step of displaying said data heading and data columns in a single window in said web browser.

6. A process for visually displaying multiple information and row headings on a computer screen using an inter- or intra-net web browser comprising the steps of:

a) providing a data file having a first data heading columns and a plurality of first data columns associated with and to the right of said first data heading column and a second data heading columns and a plurality of second data columns associated with and to the right of said second data heading column, the second data heading column and associated second data columns being to the right of said first data columns;

b) identifying each of said first and second data heading columns with an HTML tag;

c) locking said first data heading column on a left side position of said computer screen;

d) scrolling said first data columns across to the left and off said screen while said first data heading column is locked on the left side screen position;

e) scrolling said second data heading column across to the left and locking said second data heading column on said left side position of said computer screen, thereby displacing said first data heading column; and f) scrolling said second data columns across to the left and off said screen while said second data heading column is locked on the left side screen position.

7. The process of claim 6 wherein in step (e) said first data heading column is displaced off said screen.

8. A process for visually displaying multiple information and row headings on a computer screen using an inter- or intra-net web browser comprising the steps of:

a) providing a data file having a first data heading columns and a plurality of first data columns associated with and to the right of said first data heading column and a second data heading columns and a plurality of second data columns associated with and to the right of said second data heading column, the second data heading column and associated second data columns being to the right of said first data columns;

b) identifying each of said first and second data heading columns with an HTML tag;

c) locking said second data heading column on a left side position of said computer screen;

d) scrolling said second data columns across to the right and off said screen while said second data heading column is locked on the left side screen position, until a left-most second data column is adjacent said second data heading column;

e) locking said first data heading column on said left side position of said computer screen, thereby displacing said second data heading column; and f) scrolling said first data columns across to the right of said screen while said first data heading column is locked on the left side screen position.

9. The process of claim 8 wherein in step (e) said second data heading column is displaced off said screen.

10. A program storage device readable by a machine, tangibly embodying a program of instructions executable by the machine to perform a method of visually displaying multiple information and row headings on a computer screen using an inter- or intra-net web browser, said method comprising the steps of:

a) providing a data file having a first data heading column and a plurality of data columns associated with said data heading column;

b) identifying said first data heading column with a non-displaceable HTML tag;

c) locking said first data heading column on a side position of said computer screen;

d) scrolling said data columns across and off said screen while said first data heading column is locked on the side screen position; and e) scrolling a second data heading column across said screen until said second data heading column is locked adjacent the first data heading column, such that the first and second data heading columns remain locked in the side screen position.

11. The program storage device of claim 10 wherein step (b) of the method said HTML tag is a scroll tag comprising hypertext markup language.

12. The program storage device of claim 10 wherein step (a) of the method said data heading column comprises a plurality of columns containing data headings, and wherein in steps (c) and (d) the plurality of data heading columns are locked in said side screen position.

13. The program storage device of claim 10 wherein step (a) of the method each of said data heading and data columns contain multiple rows.

14. The program storage device of claim 10 wherein the method includes the step of displaying said data heading and data columns in a single window in said web browser.

15. A program storage device readable by a machine, tangibly embodying a program of instructions executable by the machine to perform a method of visually displaying multiple information and row headings on a computer screen using an inter- or intra-net web browser, said method comprising the steps of:

a) providing a data file having a first data heading columns and a plurality of first data columns associated with and to the right of said first data heading column and a second data heading columns and a plurality of second data columns associated with and to the right of said second data heading column, the second data heading column and associated second data columns being to the right of said first data columns;

b) identifying each of said first and second data heading columns with an HTML tag;

c) locking said first data heading column on a left side position of said computer screen;

d) scrolling said first data columns across to the left and off said screen while said first data heading column is locked on the left side screen position;

e) scrolling said second data heading column across to the left and locking said second data heading column on said left side position of said computer screen, thereby displacing said first data heading column; and f) scrolling said second data columns across to the left and off said screen while said second data heading column is locked on the left side screen position.

16. The program storage device of claim 15 wherein in step (e) of the method said first data healing column is displaced off said screen.

17. A program storage device readable by a machine, tangibly embodying a program of instructions executable by the machine to perform a method of visually displaying multiple information and row headings on a computer screen using an inter- or intra-net web browser, said method comprising the steps of:

a) providing a data file having a first: data heading columns and a plurality of first data columns associated with and to the right of said first data heading column and a second data heading columns and a plurality of second data columns associated with and to the right of said second data heading column, the second data heading column and associated second data columns being to the right of said first data columns;

b) identifying each of said first and second data heading columns with an HTML tag;

c) locking said second data heading column on a left side position of said computer screen;

d) scrolling said second data columns across to the right and off said screen while said second data heading column is locked on the left side screen position, until a left-most second data column is adjacent said second data heading column;

e) locking said first data heading column on said left side position of said computer screen, thereby displacing said second data heading column; and f) scrolling said first data columns across to the right of said screen while said first data heading column is locked on the left side screen position.

18. The program storage device of claim of claim 17 wherein step (e) of the method said second data heading column is displaced off said screen.

19. A system for visually displaying multiple information and row headings on a computer screen using an inter- or intra-net web browser comprising:

a data file readable by said web browser having a first data heading column and a plurality of data columns associated with said first data heading column; and said first data heading column having a non-displaceable HTML tag, said first data heading column being adapted to lock on a side position of said computer screen and said data columns being adapted to scroll across and off said screen while said data heading column is locked on the side screen position, said data file further being adapted to scroll a second data heading column across said screen until said second data heading column is locked adjacent the first data heading column, such that the first and second data heading columns remain locked in the side screen position.

20. The system of claim 19 wherein said HTML tag is a scroll tag adapted to hypertext markup language.

21. The system of claim 19 wherein said data heading column comprises a plurality of columns containing data headings, and wherein the plurality of data heading columns are adapted to lock in said side screen position.

22. The system of claim 19 wherein each of said data heading and data columns contain multiple rows.

23. The system of claim 19 wherein said data file is adapted to display said data heading and data columns in a single window in said web browser.

24. A system for visually displaying multiple information and row headings on a computer screen using an inter- or intra-net web browser comprising:

a data file readable by said web browser having a first data heading columns and a plurality of first data columns associated with and to the right of said first data heading column and a second data heading columns and a plurality of second data columns associated with and to the right of said second data heading column, the second data heading column and associated second data columns being to the right of said first data columns; and a first and second data heading columns with an HTML tag, said first data heading column being adapted to lock on a left side position of said computer screen, said first data columns being adapted to scroll across to the left and off said screen while said first data heading column is locked on the left side screen position, said second data heading column being adapted to scroll across to the left and lock or said left side position of said computer screen, thereby displacing said first data heading column, and said second data columns being adapted to scroll across to the left and off said screen while said second data heading column is locked on the left side screen position.

25. The system of claim 24 wherein said first data heading column is adapted to be displaced off said screen.

26. A system for visually displaying multiple information and row headings on a computer screen using an inter- or intra-net web browser comprising:

a data file readable by said web browser having a first data heading columns and a plurality of first data columns associated with and to the right of said first data heading column and a second data heading columns and a plurality of second data columns associated with and to the right of said second data heading column, the second data heading column and associated second data columns being to the right of said first data columns; and b) a first and second data heading columns with an HTML tag, said second data heading column being adapted to lock on a left side position of said computer screen, said second data columns being adapted to scroll across to the right and off said screen while said second data heading column is locked on the left side screen position, until a left-most second data column is adjacent said second data heading column, said first data heading column being adapted to lock on said left side position of said computer screen, thereby displacing said second data heading column, and said first data columns being adapted to scroll across to the right of said screen while said first data heading column is locked on the left side screen position.

27. The system of claim 26 wherein said second data heading column is adapted to be displaced off said screen.

28. An article of manufacture for visually displaying multiple information and row headings on a computer screen using an inter- or intra-net web browser comprising:

a data file readable by said web browser having a first data heading columns and a plurality of first data columns associated with and to the right of said first data heading column and a second data heading columns and a plurality of second data columns associated with and to the right of said second data heading column, the second data heading column and associated second data columns being to the right of said first data columns;

a means for locking said first data heading column on a left side position of said computer screen;

a means for scrolling said first data columns across to the left and off said screen while said first data heading column is locked on the left side screen position;

a means for scrolling said second data heading column across to the left and locking said second data heading column on said left side position of said computer screen, thereby displacing said first data heading column; and a means for scrolling said second data columns across to the left and off said screen while said second data heading column is locked on the left side screen position.

29. An article of manufacture for visually displaying multiple information and row headings on a computer screen using an inter- or intra-net web browser comprising:

a data file readable by said web browser having a first data heading columns and a plurality of first data columns associated with and to the right of said first data heading column and a second data heading columns and a plurality of second data columns associated with and to the right of said second data heading column, the second data heading column and associated second data columns being to the right of said first data columns;

a means for identifying each of said first and second data heading columns with an HTML tag;

a means for locking said second data heading column on a left side position of said computer screen;

a means for scrolling said second data columns across to the right and off said screen while said second data heading column is locked on the left side screen position, until a left-most second data column is adjacent said second data heading column;

a means for locking said first data heading column on said left side position of said computer screen;

a means for scrolling said first data columns across to the right of said screen while said first data heading column is locked on the left side screen position.

30. A process for visually displaying multiple information and row headings on a computer screen using an inter- or intra-net web browser comprising the steps of:

a) providing a data file having a first data heading column and a plurality of data columns associated with said first data heading column;

b) identifying said first data heading column with a displaceable HTML tag;

c) locking said first data heading column on a side position of said computer screen;

d) scrolling said data columns across and off said screen while said first data heading column is locked on the side screen position; and e) scrolling a second data heading column across said screen to the side screen position, such that the second data heading column displaces the first data heading column and the second data heading column is locked in the side screen position.

31. A system for visually displaying multiple information and low headings on a computer screen using an inter- or intra-net web browser comprising:

a data file readable by said web browser having a first data heading column and a plurality of data columns associated with said first data heading column; and said first data heading column having a displaceable HTML tag, said first data heading column being adapted to lock on a side position of said computer screen and said data columns being adapted to scroll across and off said screen while said first data heading column is locked on the side screen position, said data file further being adapted to scroll a second data heading column across said screen to the side screen position, such that the second data heading column displaces the first data heading column and the second data heading column is locked in the side screen position.

* * * * *

UNITED STATES PATENT AND TRADEMARK OFFICE
CERTIFICATE OF CORRECTION

PATENT NO. : 6,232,967 B1
DATED : May 15, 2001
INVENTOR(S) : Kelley et al.

It is certified that error appears in the above-identified patent and that said Letters Patent is hereby corrected as shown below:

Column 5,
Line 2, delete "beb" and substitute therefore -- web --

Column 11,
Line 8, delete "column" and substitute therefore -- columns --
Line 9, delete "columns" and substitute therefore -- column --
Line 51, delete "columns" and substitute therefore -- column --

Column 12,
Lnie 5, delete "columns" and substitute therefore -- column --
Line 12, delete "columns" and substitute therefore -- column --
Line 13, delete "provides" and substitute therefore -- provided --
Line 52, delete "charge" and substitute therefore -- change --

Column 14,
Line 45, delete "remains" and substitute therefore -- remain --

Column 27,
Line 6, delete "*them."

Column 28, claim 3,
Line 30, after "data" delete "."

Column 28, claim 6,
Line 40, delete "columns" and substitute therefore -- column --
Line 43, delete "columns" and substitute therefore -- column --

Column 29, claim 8,
Line 1, delete "columns" and substitute therefore -- column --
Line 4, delete "columns" and substitute therefore -- column --

Column 30, claim 15,
Line 1, delete "columns" and substitute therefore -- column --
Line 4, delete "columns" and substitute therefore -- column --

Column 30, claim 16,
Line 25, delete "healing" and substitute therefore -- heading --

Column 30, claim 17,
Line 33, after "first" delete ":"

UNITED STATES PATENT AND TRADEMARK OFFICE
CERTIFICATE OF CORRECTION

PATENT NO.    : 6,232,967 B1
DATED         : May 15, 2001
INVENTOR(S)   : Kelley et al.

It is certified that error appears in the above-identified patent and that said Letters Patent is hereby corrected as shown below:

Column 30, claim 17,
Line 34, delete "columns" and substitute therefore -- column --
Line 36, delete "columns" and substitute therefore -- column --

Column 30, claim 18,
Line 57, delete second instance "of claim"

Column 31, claim 24,
Line 25, delete first instance "columns" and substitute therefore -- column --
Line 27, delete "columns" and substitute therefore -- column --
Line 40, delete "or" and substitute therefore -- on --

Column 31, claim 26,
Line 52, delete "columns" and substitute therefore -- column --
Line 54, delete "columns" and substitute therefore -- column --
Line 61, delete "columns" and substitute therefore -- column --

Column 32, claim 28,
Line 15, delete "columns" and substitute therefore -- column --
Line 17, delete "columns" and substitute therefore -- column --

Column 32, claim 29,
Line 40, delete "columns" and substitute therefore -- column --

Signed and Sealed this

Twenty-seventh of November, 2001

*Attest:*

*Nicholas P. Godici*

*Attesting Officer*

NICHOLAS P. GODICI
*Acting Director of the United States Patent and Trademark Office*